July 21, 1925.
T. H. THOMAS
1,546,519
SPEED CONTROL DEVICE
Filed July 14, 1923
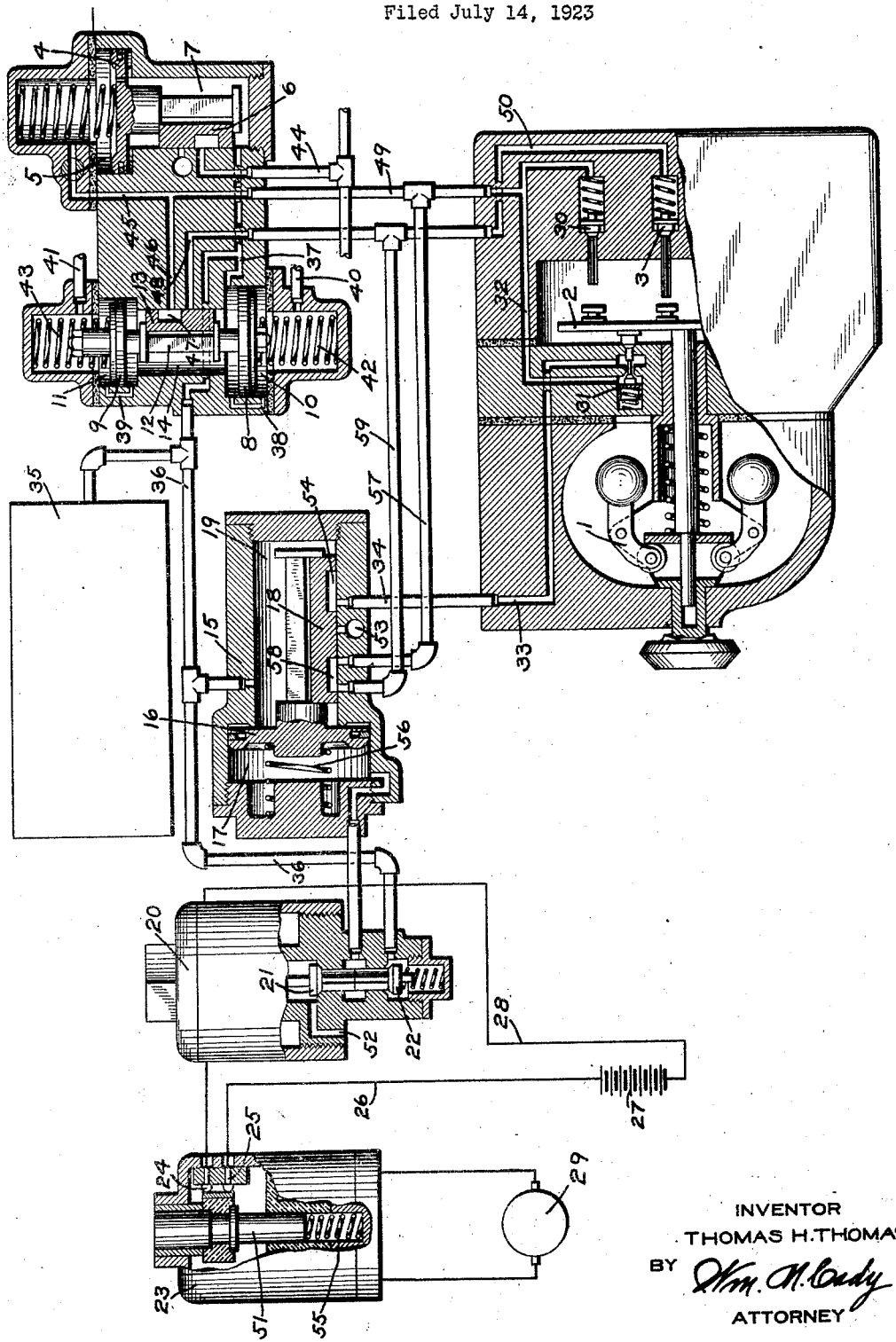
INVENTOR
THOMAS H. THOMAS,
BY *Wm. N. Cady*
ATTORNEY Patented July 21, 1925.

1,546,519

UNITED STATES PATENT OFFICE.

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

SPEED-CONTROL DEVICE.

Application filed July 14, 1923. Serial No. 651,619.

*To all whom it may concern:*

Be it known that I, THOMAS H. THOMAS, a citizen of the United States, residing at Edgewood, in the county of Allegheny and State of Pennsylvania, have invented new and useful Improvements in Speed-Control Devices, of which the following is a specification.

This invention relates to automatic train speed control apparatus and the principal object of my invention is to provide means whereby in the event of failure of certain parts, the train may proceed only under safe restricted speed limits.

Other objects and advantages will appear in the following more detailed description of the invention.

In the accompanying drawing, the single figure is a diagrammatic view, partly in section, of a train speed control apparatus embodying my invention.

Only such portion of a train speed control equipment is shown in the drawing as deemed necessary to a clear understanding of the invention. The apparatus shown includes a centrifuge 1 operatively connected to an axle of the vehicle so as to rotate at a speed proportional to the speed of the vehicle. A crosshead 2 is operatively connected to the centrifuge 1, so that the crosshead is moved to the right as the speed of the train is increased. Adapted to be operated by movement of the crosshead 2 are a plurality of valves including a low speed valve 3 which is adapted to be unseated upon movement of the crosshead toward the right.

A brake application valve device is provided comprising a piston 4 contained in piston chamber 5 and a slide valve 6 contained in valve chamber 7 and adapted to be operated by piston 4.

The speed control apparatus may be arranged to provide three speed limits for the train, such as high, medium, and low speeds, and in this connection, a change speed valve device is employed which may comprise differential pistons 8 and 9 contained in the respective piston chambers 10 and 11 and connected by a stem 12.

A slide valve 13 operable by the movement of the pistons 8 and 9 is contained in a valve chamber 14 which is intermediate said pistons. The intermediate position of the change speed valve device shown in the drawing is the high speed position, the lower position the low speed position, and the upper position the medium speed position.

According to my invention, a safety control valve device 15 is provided comprising a piston 16 contained in piston chamber 17 and a slide valve 18 contained in valve chamber 19 and adapted to be operated by piston 16. For controlling the operation of the safety control valve device 15, a magnet valve device is provided comprising a magnet 20 and double beat valves 21 and 22 adapted to be operated upon energization and deenergization of the magnet 20.

The circuit of the magnet 20 is controlled by a relay 23 which is connected in circuit with an electric generator 29 driven from an axle of the vehicle. A contact 24 controlled by the relay 23 is connected to one terminal of the magnet 20. A contact 25 of relay 23 is connected to a wire 26 which leads to one terminal of a source of direct current 27, the other terminal of said source being connected to magnet 20 by wire 28.

The valve chamber 19 of the safety control valve device 15 is charged with fluid under pressure from the main reservoir 35 through pipe 36 and valve chambers 14 and 7 of the change speed valve device and the application valve device are also charged with fluid under pressure from the main reservoir through pipe 36 and passage 37. Fluid under pressure equalizes from valve chamber 14 through ports 38 and 39 to the respective piston chambers 10 and 11 when the pistons 8 and 9 are in the positions shown in the drawing.

For the purpose of describing the operation of my invention, it is not deemed necessary to show and describe the complete construction and operation of the speed control equipment but it may be stated that when the indication is for high speed, communication through pipes 40 and 41 leading to the piston chambers 10 and 11 is closed, so that the springs 42 and 43 maintain the pistons 8 and 9 in the intermediate or high speed position, as shown in the drawing. When the signal indication changes to medium speed, fluid is vented from piston chamber 11 through pipe 41, so that the pistons 8 and 9 move upwardly to the medium speed position. When the signal indication changes to low speed, fluid is vented from piston chamber 10, so that the pistons move to their lower or low speed position.

When the parts are in order and operative, if the signal indication is for high speed, and the train speed exceeds the high speed limit, the centrifuge 1 will move the crosshead 2 sufficiently to the right so as to open the high speed valve 30 and vent fluid from piston chamber 5 of the application valve device. The slide valve 6 is then shifted so that fluid is vented from the brake pipe 44 to effect an application of the brakes. If the signal indication changes to medium speed, and the speed of the train exceeds the medium speed limit the movement of the crosshead 2 to the right will open the medium speed valve (not shown) and connections are then made, so that fluid is vented from piston chamber 5 to effect an application of the brakes. If the signal indication changes to low speed and the speed of the train should exceed the low speed limit, the movement of the crosshead 2 will open the low speed valve 3 and the change speed valve device being in its low speed position, fluid is vented from piston chamber 5 through passage 45, passage 46, cavity 47 in slide valve 13, and passage 48 which is connected through pipe 49 and passage 50 with the low speed valve 3.

If the centrifuge or speed governor 1 becomes defective, failing to operate as intended, the crosshead 2 will be shifted to the extreme left, as shown in the drawing. This results in the opening of a valve 31, so that communication is established from the application piston chamber 5, through passage 45, pipe 49, passage 32, past the open valve 31 to passage 33 and pipe 34, which opens at the seat of slide valve 18.

When the train is running at a speed above a predetermined low speed limit, the relay 23 will be energized by current from the axle driven generator 29 so that the plunger 51 of the relay will be moved downwardly, opening the circuit of the magnet 20 at the contacts 24 and 25. The magnet 20 is consequently deenergized, permitting the lower valve 22 to seat and the upper valve 21 to open. Fluid under pressure is then vented from piston chamber 17 by way of exhaust port 52 and piston 16 is shifted to its extreme left hand position by the fluid pressure in valve chamber 19.

In this position, the slide valve 18 connects pipe 34 with exhaust port 53, through cavity 54, so that the application piston chamber 5 is connected to the atmosphere when the speed governor 1 fails, causing the movement of piston 4 and slide valve 6 to application position, in which fluid is vented from the brake pipe 44 to effect an application of the brakes. The brakes will now remain applied until the speed of the train has been reduced to a low speed limit, such that current from the axle driven generator 29 will not be sufficient to maintain the relay 23 energized and then the relay plunger will be moved to its upper position by the spring 55, in which position, as shown in the drawing, the circuit of magnet 20 is closed through the contacts 24 and 25 and magnet 20 is energized from the source of current 27. The energization of magnet 20 causes the valve 21 to seat and valve 22 to open, so that fluid under pressure is supplied from the main reservoir pipe 36 to piston chamber 17. Fluid pressures on opposite sides of piston 16 being thus equalized, the piston 16 is moved to its extreme right hand position by spring 56, shifting the slide valve 18 so as to cut off the exhaust from application piston chamber 5.

The application valve device will then return to release position, cutting off the venting of fluid from the brake pipe and permitting the brakes to release, so that the train may now proceed at a speed slightly less than the low speed limit above which the relay 23 becomes energized.

If the speed governor is operating as intended, but current to the relay 23 should fail, due to a broken wire to the generator 29 or failure of the generator itself, or for other cause, and while the train is running at a speed above the normal energizing speed of the generator 29, then the relay 23 being deenergized, the circuit of the magnet 20 will be closed and the magnet 20 will be energized. The valve 21 will then be closed and valve 22 opened, so that fluid under pressure is supplied to piston chamber 17 and thereby the piston 16 is shifted from its normal running position to its inner position, as shown in the drawing, in which the application piston chamber 5 is connected to the low speed valve 3, independently of the position of the change speed valve device, through passage 45, pipe 49, pipe 57, cavity 58 in slide valve 18, pipe 59, and passage 50. If the speed of the train exceeds the low speed limit of the speed governor 1, the crosshead 2 will be in a position opening the low speed valve 3, so that fluid is vented from application piston chamber 5, causing movement of the application valve device to application position and a consequent application of the brakes.

When the speed of the train has been reduced to a degree slightly less than the low speed limit, the speed governor 1 will permit the low speed valve 3 to close. The application valve device will then return to its normal position, in which the exhaust of fluid from the brake pipe is cut off, so that the brakes may be released, allowing the train to proceed at the reduced speed.

It will now be seen that with the above described apparatus, if the speed governor fails for any reason, the brakes will be automatically applied, so that the speed of the train is reduced to a predetermined low degree, the electric generator will not supply sufficient current to maintain the relay energized, and consequently the parts will be operated so as to effect the movement of the application valve device to release position, permitting the release of the brakes and allowing the train to proceed at a speed less than that at which the generator will supply sufficient current to energize the relay. On the other hand, should the generator fail for any reason, the relay will be deenergized and the parts will be operated to connect the application valve device to the low speed valve of the speed governor, so that if the speed of the train exceeds this low speed train limit, the low speed valve will be operated to effect the operation of the application valve device, whereby the brakes are applied and the speed of the train reduced.

The speed at which the generator 29 will energize the relay 23 so as to operate the plunger 51 should be less than the speed at which the governor 1 will operate to open the low speed governor valve 3. For example, if the governor valve 3 is adapted to be opened at a speed of twenty miles per hour, the relay 23 may be made operative to open the circuit of magnet 20 at a speed of fifteen miles per hour, so that in accelerating the train, when the speed has been increased to fifteen miles per hour, the relay 23 will be energized to open the circuit of magnet 20, so as to effect the movement of the slide valve 18 to disconnect the low speed governor valve 3 from the application chamber 5 and then when the speed has been increased to twenty miles per hour, while the low speed valve 3 will be opened, no action will take place, except in accordance with the signal indication and in case a low speed signal indication is received.

The valve 31 should be adjusted to operate at a speed less than the deenergizing speed of the relay 23, such as a speed of twelve miles per hour, when, as in the above example, the relay 23 becomes deenergized at a speed of fifteen miles per hour.

Having now described my invention, what I claim as new and desire to secure by Letters Patent, is:—

1. In a train speed control apparatus, the combination with a mechanically driven speed responsive device, of means operative upon failure of said device for limiting the speed of the train and a vehicle driven electric generator for controlling said means.

2. In a train speed control apparatus, the combination with a mechanically driven speed governor device responsive to the speed of the train for controlling the train speed, of a vehicle driven electric generator, electrically controlled means operative upon failure of said speed governor device for limiting the speed of the train, and a relay controlled by current from said generator for controlling the circuit of said electrically controlled means.

3. In a train speed control apparatus, the combination with a speed governor device and means operative upon failure of said governor for limiting the speed of the train, of electrically controlled mechanism for rendering said means operative, a vehicle driven electric generator, and a relay controlled by current supplied from said generator for controlling the circuit of said electrically controlled mechanism.

4. In a train speed control apparatus, the combination with a speed governor device and means operative upon failure of said governor for limiting the speed of the train, of electrically controlled mechanism having one position in which said means is operative and another position in which said means is inoperative, a vehicle driven electric generator, and a relay controlled by current supplied from said generator for controlling the circuit of said electrically controlled mechanism.

5. In a train speed control apparatus, the combination with a speed governor device and means operative upon failure of said governor for limiting the speed of the train, of electrically controlled mechanism adapted when energized to assume a position in which said means is operative and when deenergized to assume a position in which said means is inoperative, a vehicle driven electric generator, and a relay supplied with current from said generator for controlling the circuit of said electrically controlled mechanism.

6. In a train speed control apparatus, the combination with a mechanically driven speed governor, of means operative upon failure of said governor for applying the brakes and electrically controlled mechanism for effecting the operation of said means to permit the release of the brakes when the speed of the train is reduced to a predetermined value.

7. In a train speed control apparatus, the combination with a speed governor device, an application valve device operated by a reduction in fluid pressure for effecting an application of the brakes, and a valve operated by said governor for reducing the pressure on said application valve device upon failure of said governor device, of an electrically controlled valve means operative upon deenergization for closing communication through which pressure on said application valve device is reduced, a vehicle driven generator, and a relay supplied with current from said generator and adapted to close the circuit of said electrically controlled means when the speed of the train and the generator exceeds a predetermined degree and to open said circuit when the speed is below a predetermined degree.

8. In a train speed control apparatus, the combination with a speed governor device, an application valve device operated by a reduction in fluid pressure for effecting an application of the brakes, and a valve operated by said governor for reducing the pressure on said application valve device upon failure of said governor device, of an electrically controlled valve means operative upon deenergization for closing communication through which pressure on said application valve device is reduced, and means for effecting the deenergization of said electrically controlled means when the speed of the train is below a predetermined degree.

9. In a train speed control apparatus, the combination with a speed governor device, an application valve device operated by a variation in fluid pressure for effecting an application of the brakes, and a valve operated by said governor device for varying the pressure on said valve device upon failure of said governor device, of electrically controlled valve means operative upon energization for opening communication through which fluid pressure is varied on said application valve device and upon deenergization for closing said communication, and means for effecting the energization of said electrically controlled means when the train speed exceeds a predetermined degree and for effecting the deenergization of said electrically controlled means when the train speed is below a predetermined degree.

10. In a train speed control apparatus, the combination with a speed governor device, an application valve device operated by a variation in fluid pressure for effecting an application of the brakes, a failure valve operated by said governor device for varying the fluid pressure on said valve device upon failure of said governor device, and a speed control valve operated by said governor device at a predetermined train speed for varying the pressure on said valve device, of electrically controlled valve means for controlling communication through which said failure valve varies the fluid pressure on said valve device and communication from said valve device to said speed control valve and electric means responsive to the speed of the train for controlling the operation of said electrically controlled means.

11. In a train speed control apparatus, the combination with a speed governor device, an application valve device operated by a variation in fluid pressure for effecting an application of the brakes, a failure valve operated by said governor device for varying the fluid pressure on said valve device upon failure of said governor device, and a speed control valve operated by said governor device at a predetermined train speed for varying the pressure on said valve device, of electrically controlled valve means adapted upon energization to open communication through which said failure valve varies the fluid pressure on said valve device and upon deenergization to close said communication and to open communication from said valve device to said speed control valve and electric means responsive to the speed of the train for effecting the energization and deenergization of said electrically controlled valve means.

12. In a train speed control apparatus, the combination with a speed governor device, an application valve device operative to effect an application of the brakes, and a speed control valve operated by said governor device at a predetermined train speed for operating said valve device, of electrically controlled valve means adapted upon energization to effect the operation of said valve device if the speed governor fails and upon deenergization to open communication from said valve device to said speed control valve and means responsive to the speed of the train for effecting the energization and deenergization of said electrically controlled valve means.

In testimony whereof I have hereunto set my hand.

THOMAS H. THOMAS.